United States Patent [19]

Armistead

[11] Patent Number: 4,905,659

[45] Date of Patent: Mar. 6, 1990

[54] PORTABLE CAMP STOVE, AND FUEL CONTAINER

[76] Inventor: James N. Armistead, 2727 Capitol Ave., Sacramento, Calif. 95816

[21] Appl. No.: 264,897

[22] Filed: Feb. 27, 1989

[51] Int. Cl.4 .............................................. F24C 1/16
[52] U.S. Cl. .................................. 126/9 R; 126/25 A; 126/43
[58] Field of Search .................. 126/263, 1 R, 43, 146, 126/262, 211, 266, 9 B, 9 R, 50, 25 R, 38, 29, 9 A

[56] References Cited

U.S. PATENT DOCUMENTS

| 936,482 | 10/1909 | Seeley | 126/43 |
|---|---|---|---|
| 1,106,176 | 8/1914 | Wormser | 126/266 |
| 1,437,073 | 11/1922 | Popper | 126/43 |
| 1,604,727 | 10/1926 | Volke | 126/43 |
| 2,386,501 | 10/1945 | Pearson | 126/9 R |
| 2,464,817 | 3/1949 | Laliberte | 126/43 |
| 2,604,089 | 7/1952 | Peyser | 126/262 |
| 3,552,379 | 1/1971 | Clarke | 126/262 |
| 3,566,857 | 3/1971 | Price | 126/262 |

FOREIGN PATENT DOCUMENTS

| 87527 | 12/1920 | Switzerland | 126/43 |
|---|---|---|---|
| 2475 | of 1915 | United Kingdom | 126/38 |
| 270599 | 5/1927 | United Kingdom | 126/43 |

Primary Examiner—James C. Yeung

[57] ABSTRACT

A portable wind resistant camp stove for use with solid state fuels such as HEXAMINE or TRIOXANE in which the burner is either fixed or adjustable in relation to the cooking vessel. The camp stove, also, provides storage and packaging for the solid state fuels when not being used as a stove.

7 Claims, 1 Drawing Sheet

PORTABLE CAMP STOVE, AND FUEL CONTAINER

BACKGROUND OF THE INVENTION

This invention relates to light weight, wind resitant, portable camp stoves for back packing or military applications where the stove also provides a weather resistant package for solid state fuels easily damaged by water.

Heretofore, the camp stoves available for Hexamine, Trioxane, or other solid state fuels do not provide the equivalent wind resistant features of this "SIERRA STOVE" design, nor the weather resistant packaging for spare fuel. The "folding military camp stove" and the "wing pocket stove" designs are examples of previous designs whose patent status is unknown.

The key to the wind resistance of this stove is the tight fit of the required type of cooking vessel, an 8 oz. SIERRA CUP, a 16 oz. SIERRA MUG, or similar vessel, when used in conjunction with this SIERRA CAMP STOVE. Both cooking vessels are commonly used in California. A tapered cooking vessel is very efficient.

This stove is intended to boil water for beverages or freeze dried meals, and to warm ready-to-eat meals which are items most commonly used by back packers or troops in combat zones.

It is, therefore, one object of this invention to boil water or to warm food efficiently, so that fuel weight can be minimized. For example, one HEXAMINE tablet (MIL F-10805D), approximately 22 mmd×11 mmh, will boil one cup of water from sea level to about 6000 feet. One tablet retails for about 10¢ each.

WHAT IS UNIQUE

The deeper the cooking vessel is recessed into the camp stove, the more efficient the stove becomes; because, the "stove pipe effect" warms more surface area of the cooking vessel before heat is lost into the atmosphere. Other folding or portable stoves are not known to utilize this "stove pipe" principle.

Another objective of this "SIERRA STOVE" camp stove is to be inexpensive and disposable. Hence, it is designed to be manufactured like a standard #2½ tin can, a short #2½ tin can, a pull tab peanut can, or a slip cover canister of various shapes. Example of #2½ can: Del Monte FRUIT COCKTAIL (30 oz.) Example short #2½: Nalley or BONNIE HUBBARD BEEF STEW (24 oz.)

Any tin can larger than 4 inch diameter has difficulty fitting into the outside pockets of most back packs. However, the 4¼ d by 3.75" h slip cover canister from STEELTIN CAN CORP. makes an excellent "SIERRA STOVE" and will package 48 tablets in eight paper tube containers of HEXAMINE FUEL.

Any tin can shorter than 3.75" has difficulty packaging HEXAMINE FUEL in standard paper tubes, like MIL F-10805D, where tubes hold six tablets. A tin 4"×4" may be the best general size. PREFERRED EMBODIMENT for military application. The least expensive package may be the short #2½ tin can which will easily contain 42 tablets. TOTAL WEIGHT: About 1 lb. with fuel. CIVIL DEFENSE, too.

The third objective of this "SIERRA STOVE" camp stove design is to protect the solid state fuel "on the shelf" for an indefinite period of time from oxidation or other damage, and to protect the fuel "after opening" from minor weather hazards like rain or snow while back packing. Therefore, the air holes may be inserted or opened "in the field" by using a nail, beer opener, or other tools specified or provided at the option of manufacturer.

A replaceable lid will add weather protection after the initial opening. The lid may be plastic like a peanut can. A rubber band may be included to reseal the air holes.

Figures 1, 2:
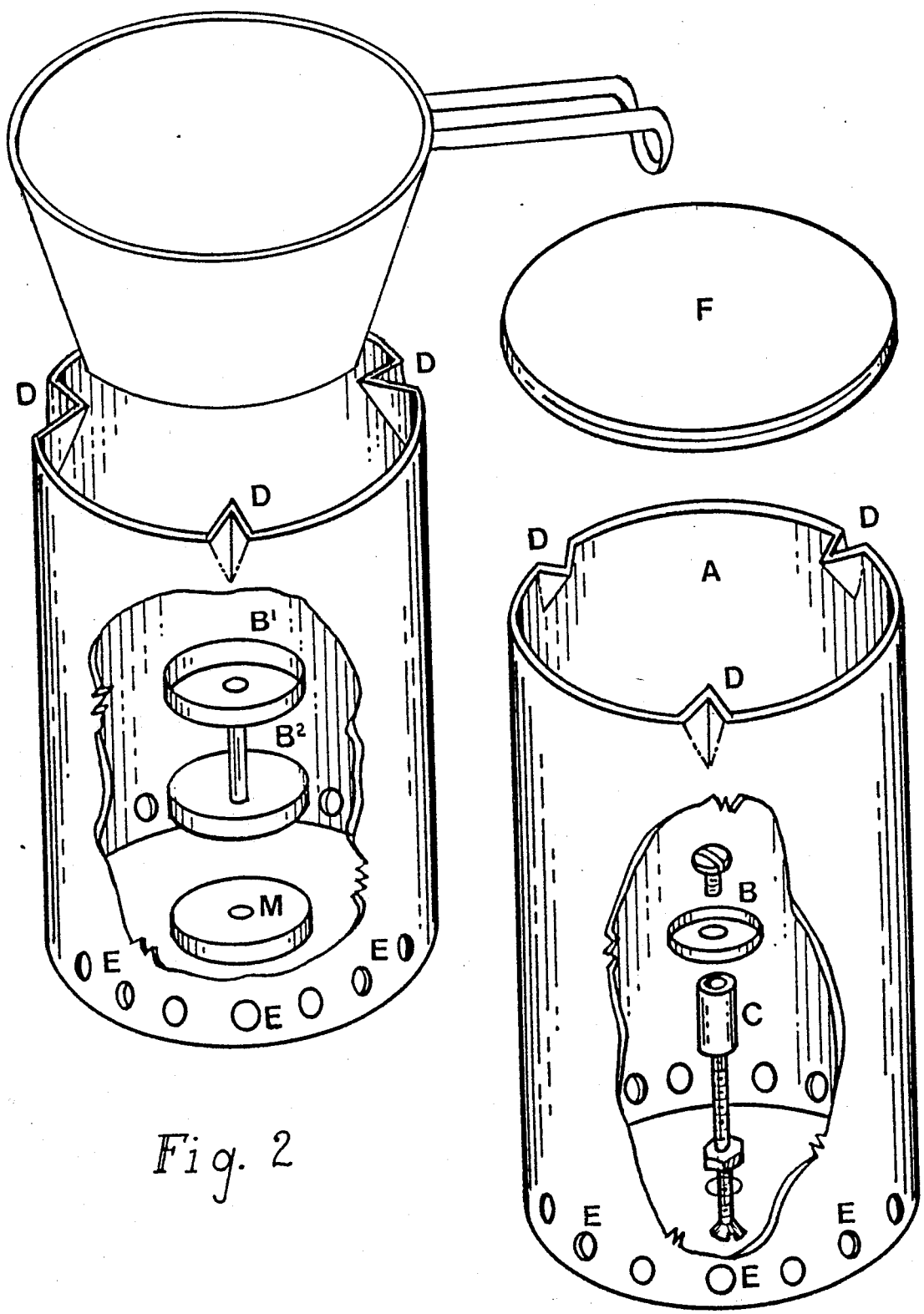
FIG. 1 (previously submitted) is a cutout view of a slip cover, F, canister with the burner sub-assembly, B and C, mounted directly to and supported from the bottom of the canister, A.

ITEM C is an electronic hardware item known as a "threaded standoff" and allows vertical adjustment of burner, B, in relation to the bottom of the cooking vessel supported from the indentations, D, on the upper rim of the canister.

ITEMS D allow the distance needed for the exhaust gasses to escape between the cooking vessel and the rim of the canister.

ITEMS E are air intake holes required for proper combustion and may be made in the field if tools are provided.

The best distance from the burner to the cooking vessel for maximum heat using HEXAMINE FUEL is believed to be 1.75"±0.125" at altitudes from sea level to 6000 feet. Therefore, the burner can be set without adjustment for many applications or easy useage.

Approximately 18 air holes (3/16" diameter) are required for combustion of HEXAMINE FUEL. Or, 3 holes made with a beer opener may be substituted with less wind resistance.

FIG. 2 is a cutout view of a tin can with a different style burner, B1 and B2, sub-assembly secured to the bottom of the can with a small magnet, M, therefore, is easily dropped in during the canning process. Indentations may be made after canning.

OPTION: FIG. 2 burner sub-assembly may be reversible to provide the user with two types of burners. A deep burner (¼") will slow the burning process to produce a longer lower heat for warming meals ready-to-eat with less risk of burning same. A shallower bottle cap-like burner burns faster and hotter for boiling water.

What is claimed:

1. A portable wind resistant camp stove apparatus comprising:

a packaging container having a tubular body fabricated from heat conductive material and provided with a top end closure and a bottom end closure;

said container having a plurality of indentations on the top end of said body which, after opening will support a cooking vessel of a smaller diameter and which will allow air gaps between said vessel and said body of container;

said container having a replaceable rain resistant top end closure;

said container having a supply of solid fuel included;

said container having a tool included for punching a plurality of air intake holes in said body near said bottom end closure;

said container having a burner sub-assembly included for holding and burning solid fuel particals;

said burner sub-assembly consisting of a bottle cap-like fuel burner, supporting member, and securing hardware; so that, said burner may be mounted parallel to the bottom end closure with said tool and centered on the inside bottom end closure;

whereby, a weather resistant disposable inexpensive camp stove is easily assembled after opening and will protect solid fuel packaged in paper containers.

2. A camp stove apparatus according to claim 1; wherein, an adjustment is provided to vary the height of said burner with included hardware for variations in altitude.

3. A camp stove apparatus according to claim 1; wherein, the fuel included is HEXAMINE.

4. A camp stove apparatus according to claim 1; wherein, the fuel included is TRIOXANE.

5. A camp stove apparatus according to claim 1; wherein, the fuel included is PARAFFIN.

6. A camp stove apparatus according to claim 1; wherein, a rubber band is included to recover the air intake holes.

7. A camp stove apparatus according to claim 1; wherein, a plurality of matches are included.

* * * * *

UNITED STATES PATENT AND TRADEMARK OFFICE
CERTIFICATE OF CORRECTION

PATENT NO. : 4,905,659

DATED : Mar. 6, 1990

INVENTOR(S) : James H. Armistead

It is certified that error appears in the above-identified patent and that said Letters Patent is hereby corrected as shown below:

On the title page, item [76] Inventor's middle initial is incorrect, the "N" should be --H--.

Col. !, line 6, "resitant" should be --resistant--.

Signed and Sealed this

Second Day of April, 1991

Attest:

HARRY F. MANBECK, JR.

Attesting Officer

Commissioner of Patents and Trademarks